(12) United States Patent
Chen

(10) Patent No.: US 11,432,700 B1
(45) Date of Patent: Sep. 6, 2022

(54) ADJUSTABLE SHAFT FOR ICE SCRAPER AND SNOW BRUSH

(71) Applicant: Chongqing Maiyi Technology Co., Ltd., Chongqing (CN)

(72) Inventor: Zhuo Chen, Chongqing (CN)

(73) Assignee: Chongqing Maiyi Technology Co., Ltd., Chongqing (CN)

( * ) Notice: Subject to any disclaimer, the term of this patent is extended or adjusted under 35 U.S.C. 154(b) by 0 days.

(21) Appl. No.: 17/529,265

(22) Filed: Nov. 18, 2021

(51) Int. Cl.
| | | |
|---|---|---|
| *A47L 13/022* | (2006.01) | |
| *B60S 3/04* | (2006.01) | |
| *B25G 1/04* | (2006.01) | |
| *A47L 13/12* | (2006.01) | |
| *A47L 13/08* | (2006.01) | |

(52) U.S. Cl.
CPC .............. *A47L 13/022* (2013.01); *A47L 13/08* (2013.01); *A47L 13/12* (2013.01); *B25G 1/04* (2013.01); *B60S 3/045* (2013.01)

(58) Field of Classification Search
CPC .......... A47L 13/022; A47L 13/02; A47L 1/16; A47L 13/11; A47L 13/12; B25G 1/04; A46B 15/0055; A46B 15/0081; B60S 3/045
USPC .......................................................... 15/111
See application file for complete search history.

(56) References Cited

U.S. PATENT DOCUMENTS

| | | | | |
|---|---|---|---|---|
| 5,515,574 A | * | 5/1996 | Larson ...................... | B25G 1/10 15/144.4 |
| 6,311,368 B1 | * | 11/2001 | Sartori ...................... | B25G 1/04 16/427 |
| 7,617,559 B2 | * | 11/2009 | Jiang ........................ | B25G 1/04 15/144.3 |
| 9,764,458 B1 | * | 9/2017 | Resh ......................... | B25G 1/04 |
| 10,611,013 B2 | * | 4/2020 | Cavaliere ................. | B25G 1/04 |
| 2007/0234497 A1 | * | 10/2007 | Lee .......................... | A47L 13/42 15/105 |

* cited by examiner

*Primary Examiner* — Laura C Guidotti
(74) *Attorney, Agent, or Firm* — Raymond Y. Chan; David and Raymond Patent Firm

(57) ABSTRACT

An adjustable shaft for an ice scraper and a snow brush includes a shaft member and an adjustable positioning arrangement. The shaft member includes an inner handle frame and an outer handle frame slidably receiving the inner handle frame for coupling the ice scraper and the snow scraper at two ends of the shaft member, wherein the inner and outer handle frames are slid with each other to selectively adjust a length of the shaft member. The adjustable positioning arrangement includes a plurality of non-through reinforcing ribs spacedly indented on the inner handle frame to reinforce a structure of the inner handle frame, and a positioning member movably coupled at the outer handle frame to selectively engage with one of the reinforcing ribs so as to lock up a relative sliding movement between the inner and outer handle frames.

10 Claims, 7 Drawing Sheets

ADJUSTABLE SHAFT FOR ICE SCRAPER AND SNOW BRUSH

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to automotive accessories, and more particularly to an adjustable shaft for an ice scraper and a snow brush, wherein the adjustable shaft comprises an adjustable positioning arrangement not only locking up the adjustable shaft at a desired length but also enhancing a strength of the adjustable shaft.

Description of Related Arts

A snow and ice removing tool for a vehicle to clean snow and ice from vehicles without scratching the paint, wherein the tool generally comprises a handle, an ice scraper coupled at one end of the handle, and a snow brush coupled at another end of the handle. The handle is generally constructed to have a length adjustable mechanism to selectively adjust a length of the handle. Conventionally, there are two types of length adjustable mechanism.

The first type of length adjustable mechanism is a detachable attaching mechanism, wherein the handle comprises two or more handle posts and one or more connectors. The handle posts are detachably couple with each other end-to-end via the connectors to selective adjust the length of the handle. Since the handle posts are identical, the lengths of the handle posts are the same. In other words, the overall length of the handle must be configured as the multiple of the handle posts, such that the length of the handle cannot be fine-adjusted according to the user preference. In addition, the size of the tool is difficult to store and carry when it is disassembled into multiple pieces.

Another type of length adjustable mechanism is a retractable mechanism, wherein the handle comprises an inner tube, an outer tube to slidably receive the inner tube, and a locker for locking the inner tube at the outer tube to retain the length of the handle. The advantage of such retractable mechanism is to enable the user to fine-adjust the length of the handle by the relative sliding movement between the inner and outer tubes. However, the handle has several drawbacks. The locker generally comprises a plurality of locking through holes spacedly formed along the inner tube and a locking head movably coupled at the outer tube to slidably insert into one of the locking through holes so as to lock up the inner and outer tubes with each other. Since the locking through holes are penetrated through the inner tube, the structural strength of the inner tube will be weakened, such that the inner tube will easily be bent or even broken during the ice and snow removing operation. Accordingly, the locking through holes are aligned in a row configuration along one side of the inner tube. It is impossible to form two or more rows of the locking through holes on the inner tube.

It is worth mentioning that the length of the handle can be selectively fine-adjusted by increasing the number of the locking through holes. On the other hand, the structural strength of the inner tube will further be weakened. In addition, ice, snow, and dirt will enter into the interior of the inner tube through the locking through holes. It is difficult to clean or remove the dirt inside inner tube, and once the locking through hole is stuck, the inner and outer tubes cannot be locked by the locker. Currently, the inner tube does involve any reinforcing structure to strength of the inner tube.

SUMMARY OF THE PRESENT INVENTION

The invention is advantageous in that it provides an adjustable shaft for an ice scraper and a snow brush, wherein the adjustable shaft comprises an adjustable positioning arrangement not only locking up a shaft member of the adjustable shaft at a desired length but also enhancing a strength of the adjustable shaft.

Another advantage of the invention is to provide an adjustable shaft for an ice scraper and a snow brush, wherein a plurality of reinforcing ribs are spacedly indented on an inner handle frame of the adjustable shaft not only to reinforce a structure of the inner handle frame but also to serve as a locking groove for locking the relative sliding movement between the inner and outer handle frames of the adjustable shaft.

Another advantage of the invention is to provide an adjustable shaft for an ice scraper and a snow brush, wherein each of the inner and outer handle frames further has a non-circular cross section to further enhance the strength of the adjustable shaft.

Another advantage of the invention is to provide an adjustable shaft for an ice scraper and a snow brush, wherein the reinforcing ribs are non-through slots indented on the flat surface of the inner handle frame to prevent any ice, snow or dirt entering into the inner handle frame.

Another advantage of the invention is to provide an adjustable shaft for an ice scraper and a snow brush, wherein the locking and unlocking operation of the adjustable shaft is easy and simple by pushing a push button to unlock the adjustable shaft for selectively adjusting the length thereof.

Another advantage of the invention is to provide an adjustable shaft for an ice scraper and a snow brush, wherein a detachable handle frame is detachably coupled to the shaft member to further extend the length of the adjustable shaft.

Another advantage of the invention is to provide an adjustable shaft for an ice scraper and a snow brush, which is easily assembled to selectively adjust different length configurations and different functional configurations.

Another advantage of the invention is to provide an adjustable shaft for an ice scraper and a snow brush, wherein the adjustable shaft is able to incorporate with any existing ice scraper and snow brush.

Another advantage of the invention is to provide an adjustable shaft for an ice scraper and a snow brush, which does not require to alter the original structural design of the existing tool for removing snow and ice on a vehicle, so as to minimize the manufacturing cost of the tool incorporating with the adjustable shaft.

Another advantage of the invention is to provide an adjustable shaft for an ice scraper and a snow brush, wherein no expensive or complicated structure is required to employ in the present invention in order to achieve the above mentioned objects. Therefore, the present invention successfully provides an economic and efficient solution for selectively adjusting the length of the adjustable shaft and for enhancing the strength of the adjustable shaft.

Additional advantages and features of the invention will become apparent from the description which follows, and may be realized by means of the instrumentalities and combinations particular point out in the appended claims.

According to the present invention, the foregoing and other objects and advantages are attained by an adjustable shaft for an ice scraper and a snow brush, comprising:

a shaft member comprising an inner handle frame and an outer handle frame slidably receiving said inner handle frame for coupling the ice scraper and the snow scraper at two ends of said shaft member, wherein said inner and outer handle frames are slid with each other to selectively adjust a length of said shaft member; and an adjustable positioning arrangement which comprises a plurality of non-through reinforcing ribs spacedly indented on said inner handle frame to reinforce a structure of said inner handle frame, and a positioning member movably coupled at said outer handle frame to selectively engage with one of said reinforcing ribs so as to lock up a relative sliding movement between said inner and outer handle frames.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
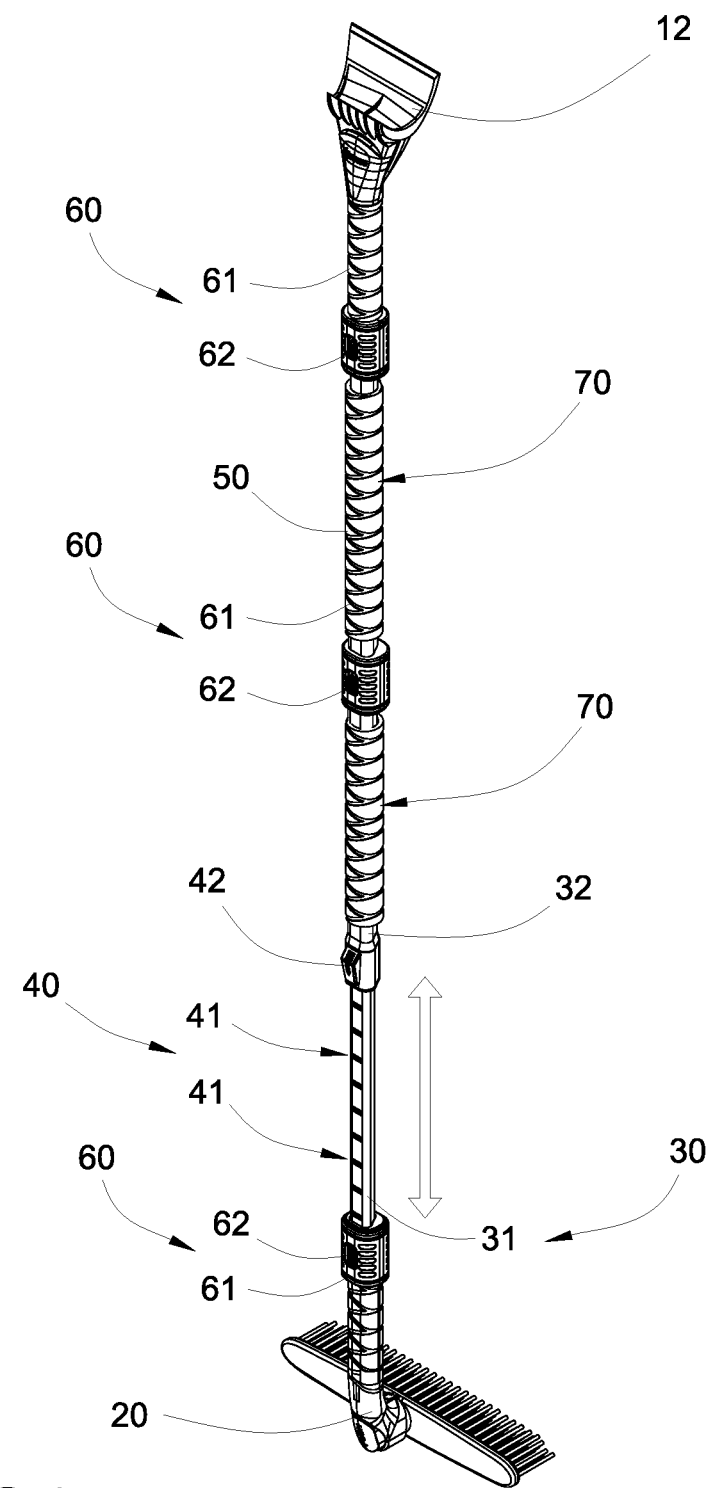
FIG. 1 is a perspective view of an adjustable shaft for an ice scraper and a snow brush according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 3 and 7 of the drawings, a tool for removing snow and ice on a vehicle is illustrated, wherein the tool comprises an adjustable shaft, an ice scraper 10 coupled at one end of the adjustable shaft, and a snow brush 20 coupled at an opposed end of the adjustable shaft. According to the preferred embodiment, the adjustable shaft comprises a shaft member 30 and an adjustable position arrangement 40.

The shaft member 30 comprises an inner handle frame 31 and an outer handle frame 32 slidably receiving the inner handle frame 31 for coupling the ice scraper 10 and the snow brush 20 at two ends of the shaft member 30, wherein the inner and outer handle frames 31, 32 are slid with each other to selectively adjust a length of the shaft member 30.

The adjustable positioning arrangement 40 comprises a plurality of non-through reinforcing ribs 41 spacedly indented on the inner handle frame 31 to reinforce a structure of the inner handle frame 31, and a positioning member 42 movably coupled at the outer handle frame 32 to selectively engage with one of the reinforcing ribs 41 so as to lock up a relative sliding movement between the inner and outer handle frames 31, 32.

According to the preferred embodiment, each of the inner and outer handle frames 31, 32 has an elongated configuration to define two free ends, wherein when the inner handle frame 31 is slid with respect to the outer handle 31, the length of the shaft member 30, i.e. a distance between the free end of the inner handle frame 31 and the free end of the outer handle frame 32, can be selectively adjusted. In other words, when the inner and outer handle frames 31, 32 are slid away from each other, the length of the shaft member 30 is prolonged, and when the inner and outer handle frames 31, 32 are slid toward each other, the length of the shaft member 30 is shortened.

Figure 4:
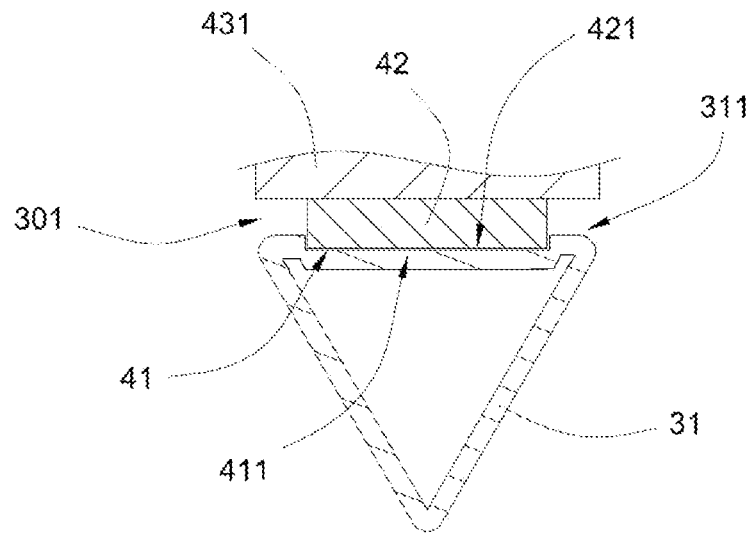
FIG. 4 is another sectional schematic view of the adjustable positioning arrangement of the adjustable shaft for the ice scraper and the snow brush according to the above preferred embodiment of the present invention.

As shown in FIG. 4, each of the inner and outer handle frames 31, 32 has a tubular cross section, wherein when the inner handle frame 31 is slidably received at the outer handle frame 32, the inner handle frame 31 can only be slid with respect to the outer handle frame 32. In other words, the inner handle frame 31 cannot be rotated with respect to the outer handle frame 32. Particularly, the outer handle frame 32 has a sliding cavity 320 which also has a tubular cross configuration matching with the non-circular cross section of the inner handle frame 31, such that the inner handle frame 31 is slidably received at the sliding cavity 320 of the outer handle frame 32.

Figure 8A:
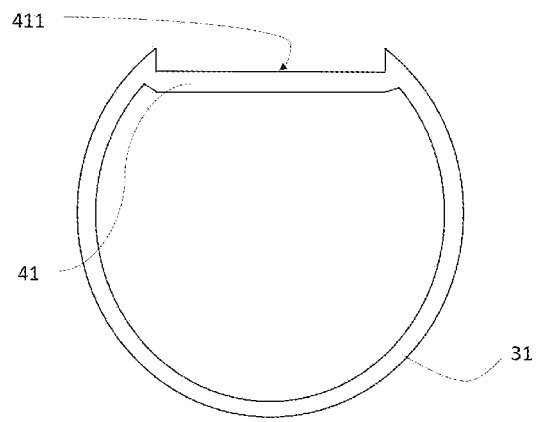
FIGS. 8A and 8B are sectional schematic views illustrating alternative mode of the handle frame according to the above preferred embodiment of the present invention.
Figure 8B:
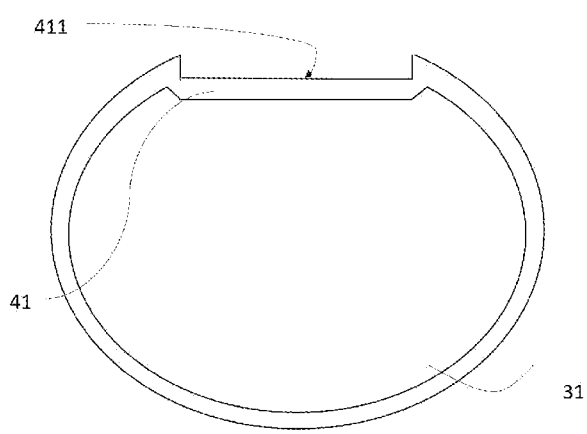

According to the preferred embodiment, the inner handle frame 31 has a non-circular cross section, preferably triangular cross section, wherein the sliding cavity 320 of the outer handle frame 32 is formed with a corresponding triangular cross section to slidably receive the inner handle frame 31. In addition, the inner handle frame 31 further has at least one flat surface 311 extended along a length direction of the inner handle frame 31, i.e. a direction between the two ends thereof. When the inner handle frame 31 is configured to have a triangular cross section, three flat surfaces 311 are formed. In another example, when the inner handle frame 31 is configured to have a rectangular cross section, two wider flat surfaces 311 and two narrower flat surfaces are formed. In other embodiments, the inner handle frame 31 and the outer handle frame 32 may also have a circular cross section or an oval cross section as shown in FIGS. 8A and 8B.

Correspondingly, the outer handle frame 32 has at least one flat wall 321 slidably engaged with the flat surface 311 of the inner handle frame 31 when the inner handle frame 31 is slidably coupled with the outer handle frame 32. A guiding gap 301 is formed between the flat surface 311 of the inner handle frame 31 and the flat wall 321 of the outer handle frame 32 when the inner handle frame 31 is slidably coupled with the outer handle frame 32. It is worth mentioning that the triangular cross sections of the inner and outer handle frames 31, 32 are configured to enhance the rigid structures thereof.

Figure 2:
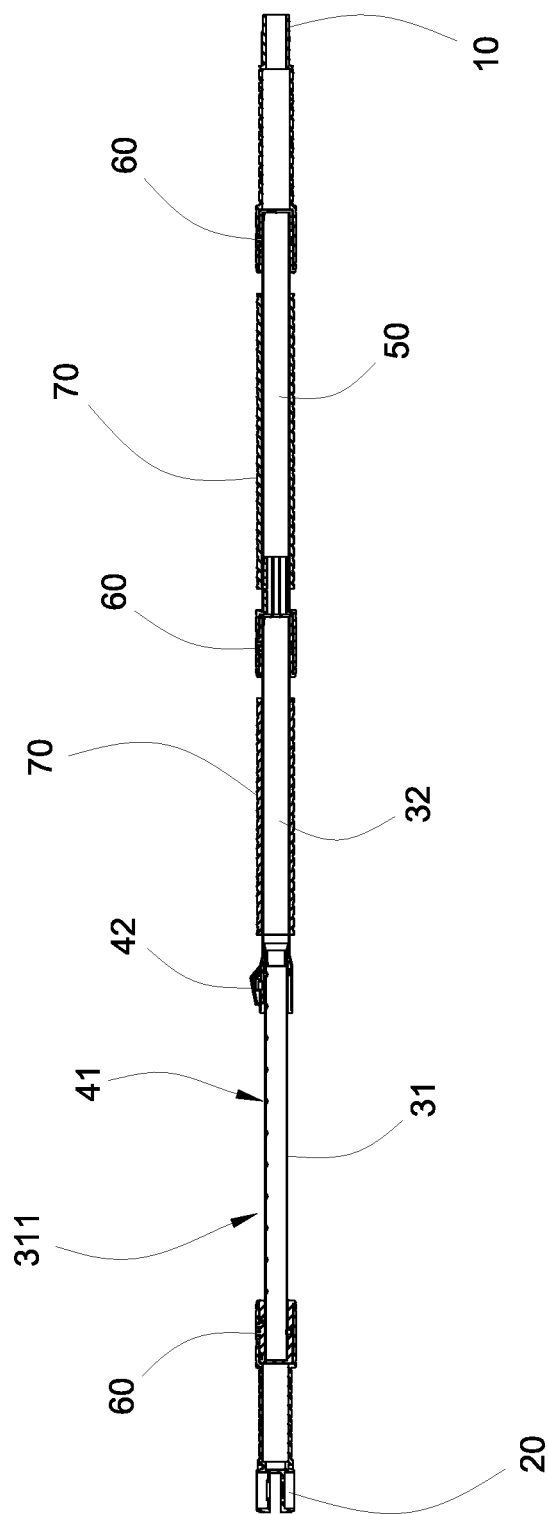
FIG. 2 is a sectional view of the adjustable shaft for the ice scraper and the snow brush according to the above preferred embodiment of the present invention.

As shown in FIG. 2, the outer handle frame 32 has an enlarged end portion defining the flat wall 321 thereon, wherein the guiding gap 301 is formed between the flat surface 311 of the inner handle frame 31 and the flat wall 321 of the enlarged end portion of the outer handle frame 32.

Figure 3:
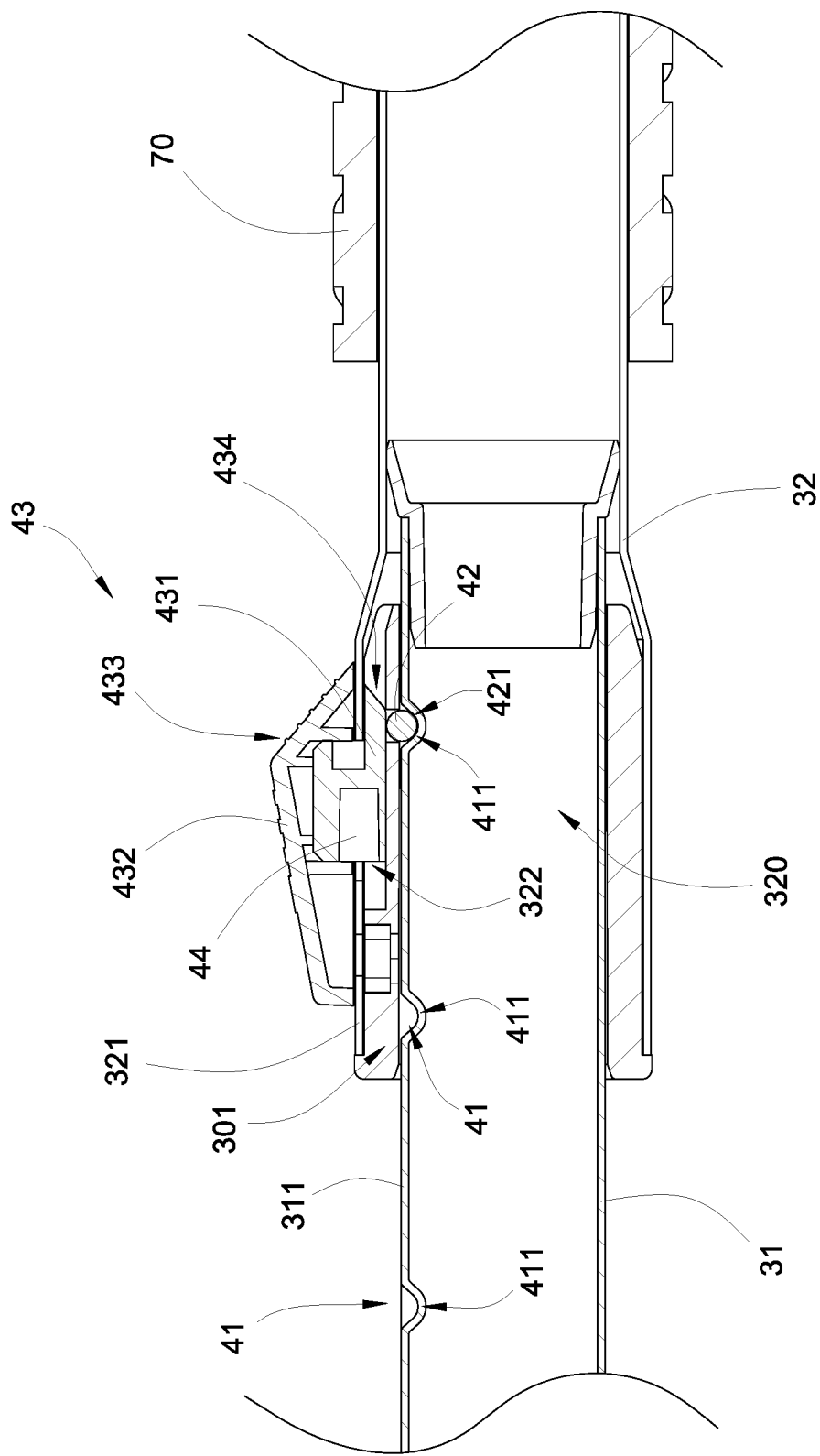
FIG. 3 is a sectional view of an adjustable positioning arrangement of the adjustable shaft for the ice scraper and the snow brush according to the above preferred embodiment of the present invention.

As shown in FIGS. 2 to 4, each of the reinforcing ribs 41 has an elongated configuration indented on the flat surface 311 of the inner handle frame 31 along a width direction of the inner handle frame 31, i.e. perpendicular to the length direction thereof. Accordingly, the reinforcing ribs 41 are parallel with each other, wherein intervals between every two of the adjacent reinforcing ribs 41 are the same. A width of each of the reinforcing ribs 41 is smaller that a width of the flat surface 311 of the inner handle frame 31.

Since the reinforcing ribs 41 are integrated with the inner handle frame 31 on the flat surface 311 thereof, the reinforcing ribs 41 will reinforce the structural configuration of the inner handle frame 31 to withstand the stress and torque to the inner handle frame 31. Preferably, the reinforcing ribs 41 are made by forming a plurality of indentions via a press machine. It is worth mentioning that the reinforcing ribs 41 are not through slots formed on the flat surface 311 of the inner handle frame 31. Therefore, the reinforcing ribs 41 will not weaken the structure of the inner handle frame 31. On the other hand, the reinforcing ribs 41 will enhance the strength of the inner handle frame 31.

Each of the reinforcing ribs 41 has a concave surface 411 integrally indented on the flat surface 311 of the inner handle frame 31. Accordingly, the concave surface 411 of each of the reinforcing ribs 41 will evenly distribute an external force applied to the inner handle frame 31. Since the reinforcing ribs 41 are not through slots, ice, snow, and dirt will not enter into the interior of the inner handle frame 31 so as to prevent any malfunctional operation of the adjustable shaft.

Correspondingly, the positioning member 42 has an elongated configuration defining a convex surface 421 sliding on the flat surface 311 of the inner handle frame 31 to selectively engage with the concave surface 411 of one of the reinforcing ribs 41. A curvature of the concave surface 411 of each of the reinforcing ribs 41 matches with a curvature of the convex surface 421 of the positioning member 42 to maximize an engaging surface area between the reinforcing rib 41 and the positioning member 42 when the positioning member 42 is engaged with the reinforcing rib 41.

Accordingly, the positioning member 42 is arranged to slide along the flat surface 311 of the inner handle frame 31. When the positioning member 42 is located on the flat surface 311 of the inner handle frame 31 without engaging with any one of the reinforcing ribs 41, the inner handle frame 31 is freely slid with respect to the outer handle frame 32. When the positioning member 42 is located at and engaged with one of the reinforcing ribs 41, the inner handle frame 31 is locked to prevent any relative sliding movement between the inner and outer handle frames 31, 32.

Preferably, the positioning member 42 has a cylindrical shape sliding along the flat surface 311 of the inner handle frame 31, wherein a height, i.e. a diameter, of the positioning member 42 is smaller than a height of the guiding gap 301, such that the positioning member 42 is free to move at the guiding gap 301 from one reinforcing rib 41 to another reinforcing rib 41.

As shown in FIG. 2, the adjustable positioning arrangement 40 further comprises a push button 43 movably coupled at the enlarged end portion of the outer handle frame 32, wherein the push button 43 is arranged to move the positioning member 42 along the flat surface 311 of the inner handle frame 31 to selectively engage with one of the reinforcing ribs 41. Accordingly, the push button 43 has an inner driving portion 431 and an outer thumb portion 432 integrally extended from the inner driving portion 431. The inner driving portion 431 of the push button 43 is extended into an interior of the outer handle frame 32 within the sliding cavity 320 thereof to press against the positioning member 42 so as to ensure the positioning member 42 being engaged with one of the reinforcing ribs 41. The outer thumb portion 432 of the push button 43 is slidably coupled at an exterior of the outer handle frame 32 to move the inner driving portion 431 away from the positioning member 42 so as to allow the positioning member 42 to move from one of the reinforcing ribs 41 to another adjacent reinforcing rib 41.

According to the preferred embodiment, the outer handle frame 32 as a guiding through slot 322 formed on the flat wall 321 to communicate the exterior of the outer handle frame 32 with the interior thereof, wherein the push button 43 is slidably coupled at the guiding through slot 322 of the outer handle frame 32. Particularly, when the push button 43 is slidably coupled at the guiding through slot 322 of the outer handle frame 32, the inner driving portion 431 of the push button 43 is located at an outer side of the flat wall 321 of the outer handle frame 32 while the outer thumb portion 432 of the push button 43 is located at an inner side of the flat wall 321 of the outer handle frame 32.

As shown in FIG. 2, the push button 43 has a push surface 433 defined at the outer thumb portion 432 to move the push button 43 between an unlocked position and a locked position. At the unlocked position, the inner driving portion 431 of the push button 43 is moved away from the positioning member 42, such that the positioning member 42 is free to slide on the flat surface 311 of the inner handle frame 31 so as to allow the relative sliding movement between the inner and outer handle frames 31, 32 for selectively adjusting the length of the shaft member 30. At the locked position, the inner driving portion 431 of the push button 43 is moved to press against the positioning member 42, such that the positioning member 42 is engaged with one of the reinforcing ribs 41 so as to lock up the relative sliding movement between the inner and outer handle frames 31, 32 for retaining the length of the shaft member 30. It is worth mentioning that when the positioning member 42 is not pressed by the inner driving portion 431 of the push button 43, the positioning member 42 is free to move at the guiding gap 301 from one reinforcing rib 41 to another reinforcing rib 41. Furthermore, the positioning member 42 is only pressed by the inner driving portion 431 of the push button 43 when the positioning member 42 is engaged with one of the reinforcing ribs 41 due to the size of the guiding gap 301.

The push button 43 further has a slanted sliding surface 434 formed at a free end of the inner driving portion 431, such that the positioning member 42 is slid at the slanted sliding surface 434 for being pressed by the inner driving portion 431 of the push button 43. In other words, the slanted sliding surface 434 is arranged to guide the push button 43 to move between the unlocked position and the locked position. Particularly, when the push button 43 is moved from the unlocked position to the locked position, the positioning member 42 is slid at the slanted sliding surface 434 until the inner driving portion 431 of the push button 43 is moved to press against the positioning member 42.

The adjustable positioning arrangement 40 further comprises a resilient element 44 coupled between the push button 43 and the outer handle frame 32 to push the inner driving portion 431 of the push button 43 pressing against the positioning member 42 so as to retain the push button 43 at the locked position. In one embodiment, the resilient element 44 is held at the guiding through slot 322 of the outer handle frame 32 between the inner driving portion 431 and the outer thumb portion 432 of the push button 43, wherein the resilient element 44 is arranged to apply an elastic force against the push button 43 for pushing the push button 43 from the unlocked position to the locked position. Preferably, the resilient element 44 is embodied as an elastic element arranged in such a manner that when the push button 43 is pushed from the locked position to the unlocked position, the resilient element 44 is compressed and deformed to store the elastic force thereat. When the pushing force applied on the push button 43 is released, the resilient element 44 will return to its original form to release the elastic force to the push button 43, so as to push the push button 43 back to the locked position from the unlocked position. It is worth mentioning that the push button 43 is pushed and held to retain the push button 43 at the unlocked position for allowing the positioning member 42 freely moving from one reinforcing rib 41 to another reinforcing rib 41 so as to selectively adjust the length of the shaft member 30. It is appreciated that the resilient element 44 can be a compression spring coupled between the push button 43 and the outer handle frame 32, such that the resilient element 44 is able to apply a spring force to push the inner driving portion 431 of the push button 43 pressing against the positioning member 42 so as to retain the push button 43 at the locked position.

Figure 5:
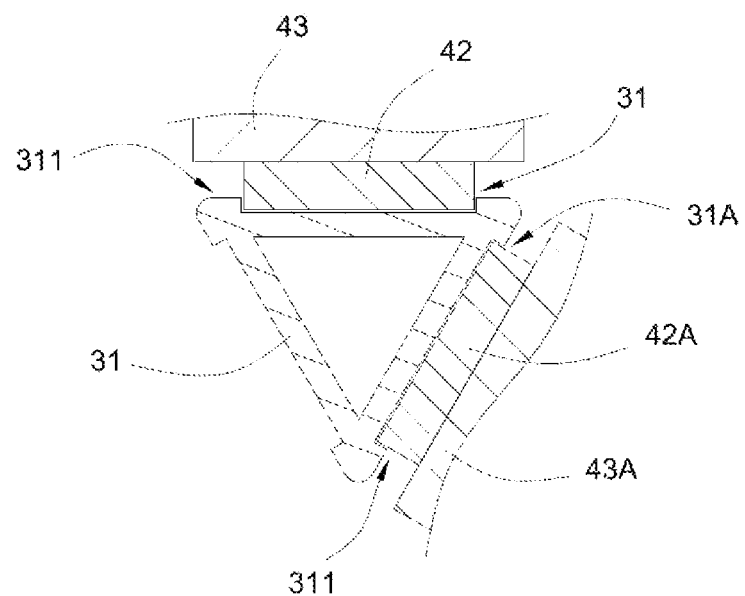
FIG. 5 illustrates an alternative mode of the adjustable positioning arrangement of the adjustable shaft for the ice scraper and the snow brush according to the above preferred embodiment of the present invention.

Accordingly, a second set of reinforcing ribs 41A can be integrally formed at another flat surface 311 of the inner handle frame 31 as shown in FIG. 5. Likewise, a second positioning member 42A is provided to selectively engage with one of the second reinforcing ribs 41A and a second push button 43A is provided to selectively lock up the second positioning member 42A at one of the second reinforcing ribs 41A. It is worth mentioning that the two push buttons 43, 43A are pushed at the same time from the unlocked position to the locked position to allow the relative sliding movement between the inner and outer handle frames 31, 32. It is worth mentioning that more than two sets of reinforcing ribs 41 can be provided when the inner handle frame 31 provides more than two flat surface 311.

Figure 6:
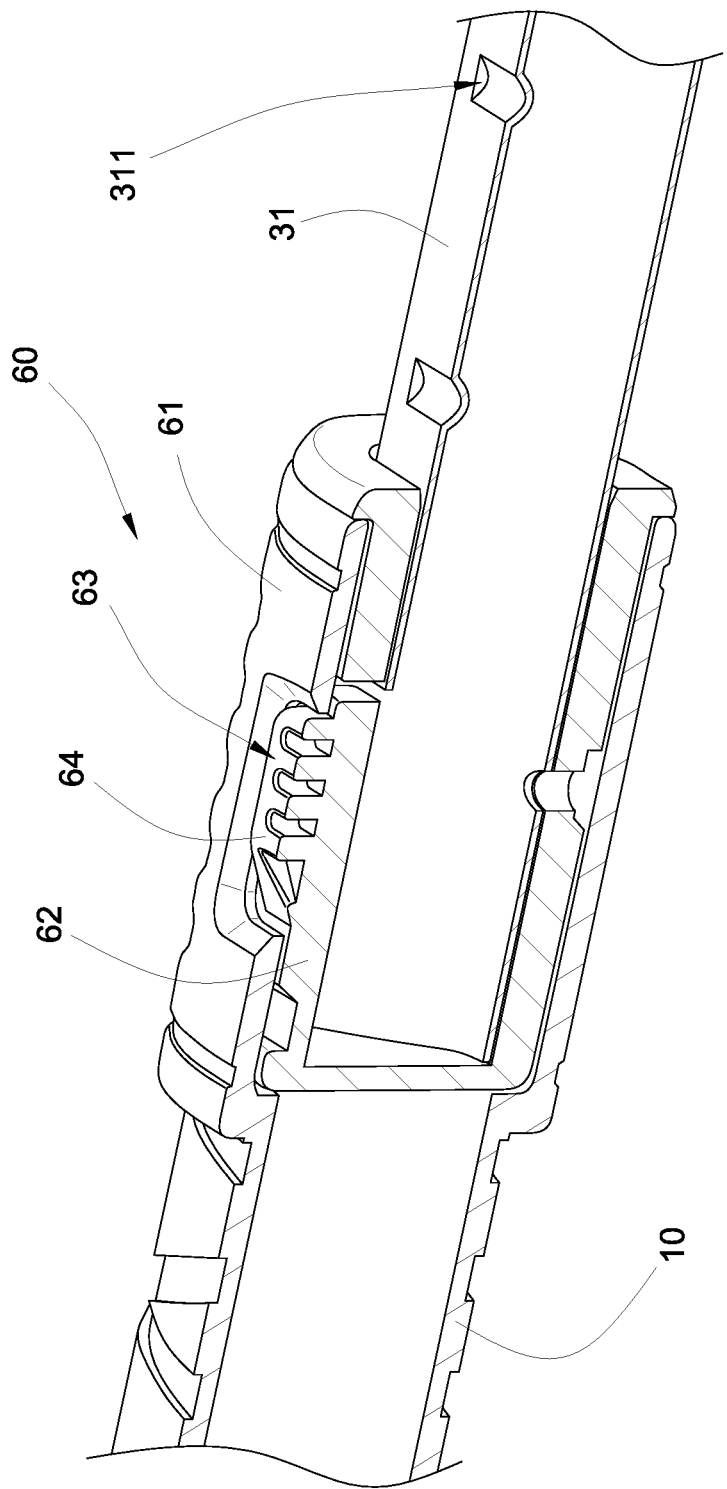
FIG. 6 is a sectional view of a detachable joint of the adjustable shaft for the ice scraper and the snow brush according to the above preferred embodiment of the present invention.

As shown in FIG. 6, the adjustable shaft further comprises a detachable handle frame 50 and a detachable joint 60 detachably coupling the detachable handle frame 50 at a free end of the outer handle frame 32 of the shaft member 30.

Accordingly, the detachable handle frame 50 has the same cross section of the outer handle frame 32. Preferably, a length of the detachable handle frame 50 is the same length of the outer handle frame 32. When the detachable handle frame 50 is detachably coupled at the outer handle frame 32 end-to-end via the detachable joint 60, the length of the adjustable shaft is prolonged. It is worth mentioning that, in one example, the ice scraper 10 is coupled at one end of the detachable handle frame 50 and the snow brush 20 is coupled at one end of the inner handle frame 31.

The detachable joint 60 comprises a connecting sleeve 61 coupled at one end of the detachable handle frame 50 and an inserting head 62 coupled at the free end of the outer handle frame 32 to detachably and slidably insert into the connecting sleeve 61 so as to detachably couple the detachable handle frame 50 at the outer handle frame 32 end-to-end. Preferably, each of the connecting sleeve 61 and the inserting head 62 has a non-circular cross section, such that when the inserting head 62 is inserted into the connecting sleeve 61, the inserting head 62 cannot be rotated within the connecting sleeve 61.

The detachable joint 60 further has a locking cavity 63 integrally formed at an outer sleeving surface of the connecting sleeve 61 and an elastic locker 64 movably coupled at the inserting head 62, such that when the inserting head 62 is slidably inserted into the connecting sleeve 61, the elastic locker 64 is engaged with the locking cavity 63 to lock up the inserting head 62 in the connecting sleeve 61. When the elastic lock 64 is pressed to disengage with the locking cavity 63, the inserting head 62 can be slidably detached from the connecting sleeve 61 so as to detach the detachable handle frame 50 from the outer handle frame 32.

According to the preferred embodiment, the ice scraper 10 is coupled at the detachable handle frame 50 via the detachable joint 60 and the snow brush 20 is coupled at the inner handle frame 31 via the detachable joint 60. In other words, three detachable joints 60 are provided for the adjustable shaft. The first detachable joint 60 is provided that the connecting sleeve 61 is coupled at the detachable handle frame 50 and the inserting head 62 is coupled at the outer handle frame 32 to detachably couple the detachable handle frame 50 at the outer handle frame 32 end-to-end. The second detachable joint 60 is provided that the connecting sleeve 61 is coupled at the ice scraper 10 and the inserting head 62 is coupled at the inner handle frame 31 to detachably couple the ice scraper 10 at the inner handle frame 31. The third detachable joint 60 is provided that the connecting sleeve 61 is coupled at the snow brush 20 and the inserting head 62 is coupled at the detachable handle frame 50 to detachably couple the snow brush 20 at the detachable handle frame 50.

Figure 7:
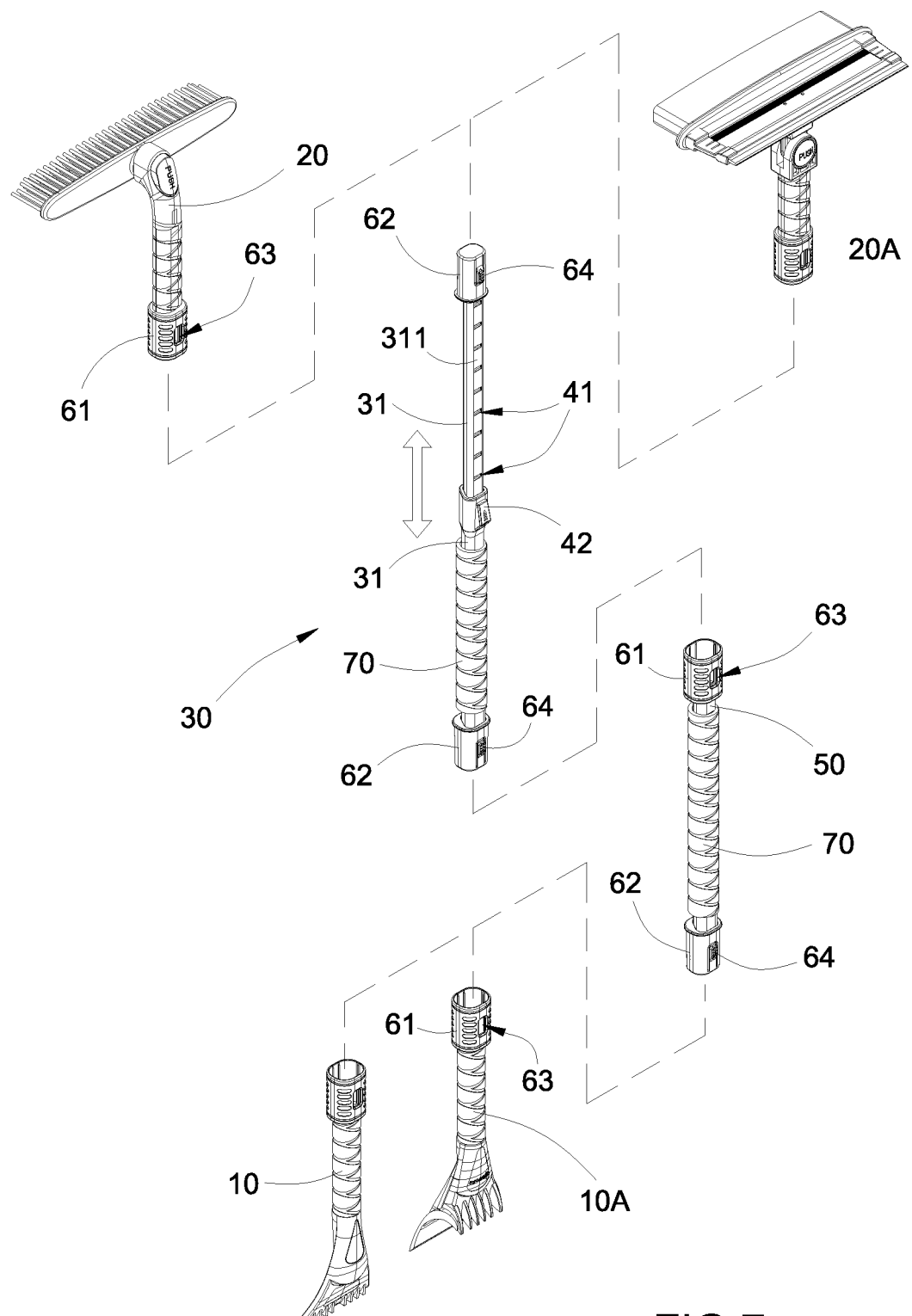
FIG. 7 is an exploded perspective view of the adjustable shaft for the ice scraper and the snow brush according to the above preferred embodiment of the present invention.

As shown in FIG. 7, it is worth mentioning that the user is able to use shaft member 30 of the adjustable shaft alone without the detachable handle frame 50 to selectively adjust the length of the adjustable shaft by the relative sliding movement between the inner and outer handle frames 31, 32. The ice scraper 10 or the snow brush 20 can be selectively coupled at one end of the inner handle frame 31 via the detachable joint 60. Likewise, the ice scraper 10 or the snow brush 20 can be selectively coupled at one end of the outer handle frame 32 via the detachable joint 60. Furthermore, the user is able to couple the detachable handle frame 50 at the outer handle frame 32 via the detachable joint 60 to prolong the length of the adjustable shaft, wherein the ice scraper 10 and the snow brush 20 can be selectively coupled at one end of the inner handle frame 31 and one end of the detachable handle frame 60 via the detachable joints 60. In one example, the, the user is able to couple a second detachable handle frame 50 at the detachable handle frame 50 via the detachable joint 60 to further prolong the length of the adjustable shaft, wherein the ice scraper 10 and the snow brush 20 can be selectively coupled at one end of the inner handle frame 31 and one end of the detachable handle frame 60 via the detachable joints 60. In one example, a structural configuration of the detachable handle frame 50 is identical to a structural configuration of the shaft member 30. In other words, the two outer handle frames 32 are detachably coupled end-to-end via the detachable joint 60, wherein the ice scraper 10 and the snow brush 20 can be selectively coupled at two ends of the inner handle frames 31 via the detachable joints 60.

Furthermore, the adjustable shaft of the present invention can be detachably coupled to different types of ice scraper 10A and snow brush 20A. As shown in FIG. 7, two different ice scrapers 10, 10A and two different snow brushes 20, 20A can be selectively coupled at two ends of the adjustable shaft via the detachable joints 60, such that the user is able to incorporate with different ice scrapers 10, 10A and different snow brushes 20, 20A to perform different operations.

As shown in FIGS. 1 to 3 ad 7, the adjustable shaft further comprising a non-slip cushioning jacket 70 encircling each of the outer handle frame 32 and the detachable handle frame 50. Therefore, the user is able to securely grip the cushioning jacket 70 to hold the outer handle frame 32 and/or the detachable handle frame 50 for operating the present invention. Preferably, the no-slip cushioning jacket 70 is made of waterproof and anti-slip material with a cushioning effect to allow the user to comfortably grip the outer handle frame 32 and/or the detachable handle frame 50.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adjustable shaft for an ice scraper and a snow brush, comprising:
a shaft member comprising an inner handle frame and an outer handle frame slidably receiving said inner handle frame for coupling the ice scraper and the snow scraper at two ends of said shaft member, wherein said inner and outer handle frames are slid with each other to selectively adjust a length of said shaft member, wherein said inner handle frame has a tubular cross section defining at least one flat surface along a length direction of said inner handle frame; and
an adjustable positioning arrangement which comprises a plurality of non-through reinforcing ribs spacedly indented on said inner handle frame to reinforce a structure of said inner handle frame, a positioning member movably coupled at said outer handle frame to selectively engage with one of said reinforcing ribs so as to lock up a relative sliding movement between said inner and outer handle frames, and a push button having an inner driving portion and an outer thumb portion, wherein each of said reinforcing ribs has an elongated configuration indented on said flat surface of said inner handle frame along a width direction of said inner handle frame and a concave surface integrally indented on said flat surface of said inner handle frame, wherein said positioning member has an elongated configuration defining a convex surface sliding on said flat surface of said inner handle frame to selectively engage with said concave surface of one of said reinforcing ribs, wherein said inner portion is extended into an interior of said outer handle frame to press against said positioning member to ensure said positioning member being engaged with one of said reinforcing ribs, and said outer thumb portion is slidably coupled at an exterior of said outer handle frame to move said inner driving portion away from said positioning member so as to allow said positioning member to move from one of said reinforcing ribs to another said reinforcing rib, wherein said push button further has a slanted sliding surface formed at a free end of said inner driving portion, such that said positioning member is slid at said slanted sliding surface for being pressed by said inner driving portion of said push button.

2. The adjustable shaft, as recited in claim 1, wherein said adjustable positioning arrangement further comprises a resilient element coupled between said push button and said outer handle frame to push said inner driving portion of said push button pressing against said positioning member.

3. The adjustable shaft, as recited in claim 2, wherein said inner handle frame has a triangular cross section, wherein said outer handle frame has a sliding cavity formed with a corresponding triangular cross section to slidably receive said inner handle frame.

4. The adjustable shaft, as recited in claim 3, further comprising a detachable handle frame and a detachable joint detachably coupling said detachable handle frame at a free end of said outer handle frame.

5. The adjustable shaft, as recited in claim 4, wherein said detachable joint comprises a connecting sleeve coupled at one end of said detachable handle frame and an inserting head coupled at said free end of said outer handle frame to detachably and slidably insert into said connecting sleeve so as to detachably couple said detachable handle frame at said outer handle frame end-to-end.

6. The adjustable shaft, as recited in claim 5, wherein said detachable joint further has a locking cavity integrally formed at an outer sleeving surface of said connecting sleeve and an elastic locker movably coupled at said inserting head, such that when said inserting head is slidably inserted into said connecting sleeve, said elastic locker is engaged with said locking cavity to lock up said inserting head in said connecting sleeve.

7. The adjustable shaft, as recited in claim 6, further comprising a non-slip cushioning jacket encircling each of said outer handle frame and said detachable handle frame.

8. An adjustable shaft for an ice scraper and a snow brush, comprising:
a shaft member comprising an inner handle frame and an outer handle frame slidably receiving said inner handle frame for coupling the ice scraper and the snow scraper at two ends of said shaft member, wherein said inner and outer handle frames are slid with each other to selectively adjust a length of said shaft member, wherein said inner handle frame has a tubular cross section defining at least one flat surface along a length direction of said inner handle frame;
an adjustable positioning arrangement which comprises a plurality of non-through reinforcing ribs spacedly indented on said inner handle frame to reinforce a structure of said inner handle frame, and a positioning member movably coupled at said outer handle frame to selectively engage with one of said reinforcing ribs so as to lock up a relative sliding movement between said inner and outer handle frames, wherein each of said reinforcing ribs has an elongated configuration indented on said flat surface of said inner handle frame along a width direction of said inner handle frame and a concave surface integrally indented on said flat surface of said inner handle frame, wherein said positioning member has an elongated configuration defining a convex surface sliding on said flat surface of said inner handle frame to selectively engage with said concave surface of one of said reinforcing ribs; and a detachable handle frame and a detachable joint detachably coupling said detachable handle frame at a free end of said outer handle frame.

9. The adjustable shaft, as recited in claim 8, wherein said detachable joint comprises a connecting sleeve coupled at one end of said detachable handle frame and an inserting head coupled at said free end of said outer handle frame to detachably and slidably insert into said connecting sleeve so as to detachably couple said detachable handle frame at said outer handle frame end-to-end.

10. The adjustable shaft, as recited in claim 9, wherein said detachable joint further has a locking cavity integrally formed at an outer sleeving surface of said connecting sleeve and an elastic locker movably coupled at said inserting head, such that when said inserting head is slidably inserted into said connecting sleeve, said elastic locker is engaged with said locking cavity to lock up said inserting head in said connecting sleeve.

* * * * *